(12) United States Patent
Kumar et al.

(10) Patent No.: US 8,275,139 B2
(45) Date of Patent: Sep. 25, 2012

(54) LINEAR FULL DUPLEX SYSTEM AND METHOD FOR ACOUSTIC ECHO CANCELLATION

(75) Inventors: Anil Kumar, Bangalore (IN); Puneet Gupta, Bangalore (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 1193 days.

(21) Appl. No.: 12/055,331

(22) Filed: Mar. 26, 2008

(65) Prior Publication Data

US 2009/0245527 A1  Oct. 1, 2009

(51) Int. Cl.
*H04B 3/20* (2006.01)
*H04M 9/08* (2006.01)
(52) U.S. Cl. ............... 381/66; 379/406.05; 379/406.08; 370/286
(58) Field of Classification Search ................ 381/66; 379/406.01–406.16
See application file for complete search history.

(56) References Cited

U.S. PATENT DOCUMENTS

| | | | | |
|---|---|---|---|---|
| 5,193,112 A | * | 3/1993 | Sano | 379/406.08 |
| 5,631,900 A | * | 5/1997 | McCaslin et al. | 370/287 |
| 6,738,358 B2 | * | 5/2004 | Bist et al. | 370/289 |
| 2003/0174661 A1 | * | 9/2003 | Lee | 370/286 |
| 2003/0206624 A1 | * | 11/2003 | Domer et al. | 379/406.01 |

* cited by examiner

*Primary Examiner* — Matthew Landau
*Assistant Examiner* — Khaja Ahmad
(74) *Attorney, Agent, or Firm* — Prakash Nama; Global IP Services, PLLC (57) ABSTRACT

A linear full duplex system and method for acoustic echo cancellation is disclosed. In one embodiment, a method includes calculating a residual echo after subtraction of an echo estimate from a near end signal associated with a communication, refining a far end and a residual signal associated with the communication, updating, based on the far end signal, the echo estimate of an echo associated with the communication, subtracting the echo from the near end signal based on the echo estimate to cancel the echo associated with the communication, updating, based on the refined far end and refined residual signal, the adaptive filter module used for echo estimation, and detecting a steady state and, during the steady state, dynamically detecting internal substates and switching between the internal substates and detecting and managing double talk associated with the communication.

16 Claims, 10 Drawing Sheets

LINEAR FULL DUPLEX SYSTEM AND METHOD FOR ACOUSTIC ECHO CANCELLATION

FIELD OF THE INVENTION

The present invention relates to communication systems and, more specifically, to a linear full duplex system and method for acoustic echo cancellation in a communication.

BACKGROUND

Acoustic echo cancellation (AEC) is used in telephony to describe a process of removing an echo from a voice communication to improve quality of a telephone call. The telephone call, for example, may be a domestic call, an international call, a Voice over Internet Protocol (VoIP) call, etc. Large network delays in VoIP calls specifically cause even a slight echo to be very discernible, irrespective of an operating mode of a user (e.g., handset mode, headset mode, speakerphone mode, etc.).

A primary challenge in AEC is to build a reliable model of an echo path encountered by a speech signal that plays out of an audio transducer. Additional requirements for ensuring a full-duplex communication for participants in a VoIP call in various operating scenarios like double talk render the challenge even more complex.

Typical implementations may have attempted to address these issues by implementing a Least Mean Square (LMS) algorithm, accompanied by a non-linear processor (NLP), using power measurements to control adaptive filter updates in an attempt to cancel the echo. The attempt, however, may result in non full-duplex performance, under cancellation of the echo, and/or over cancellation of the echo. Additionally, the quality of the communication may sound choppy or clipped to the participants.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A linear full duplex system and method for acoustic echo cancellation is disclosed. Various aspects of the linear full duplex system and method, i.e., the invention, may be applicable in various environments. For example, various aspects of the invention may be employed in cancellation of acoustic echo for communications, e.g., Voice over Internet Protocol (VoIP) communication. Other applications are also possible. In the following description, for purposes of explanation, numerous specific details are set forth in order to provide a thorough understanding of the various embodiments. It will be evident, however, to one skilled in the art that the various embodiments may be practiced without these specific details.

The terms "internal substates" and "DADS states" are interchangeably used throughout the document.

Figure 1:
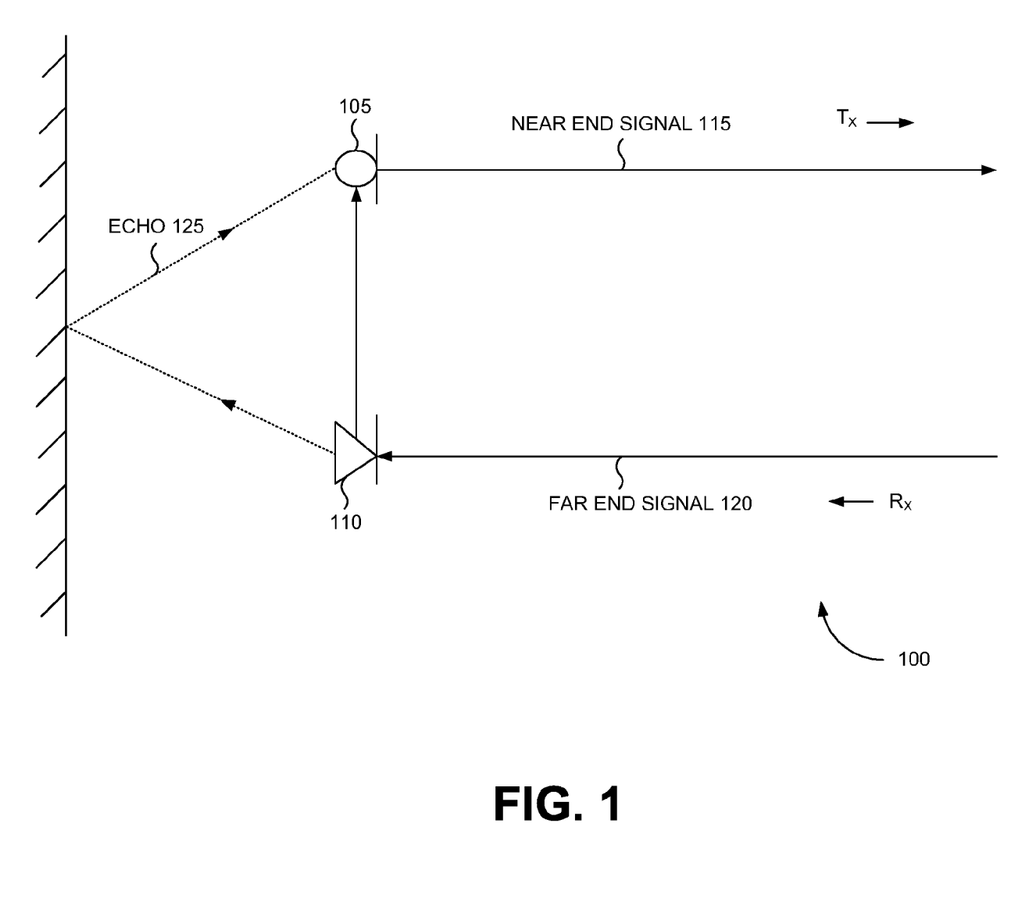
FIG. 1 illustrates a typical communication environment associated with a Voice over Internet Protocol (VoIP) communication.

FIG. 1 illustrates a typical communication environment 100 associated with a VoIP communication. Particularly, FIG. 1 illustrates, a microphone 105 (e.g., the microphone in a handset of a telephone of a near end participant in a telephone call), a speaker 110 (e.g., the speaker in the handset of the telephone of the near end participant in the telephone call), a near end signal 115, a far end signal 120 and an echo 125.

In this example, the near end signal 115 refers to the transmission signal (Tx) received into the microphone 105 and the far end signal 120 refers to the receive signal (Rx) coming into the speaker 110 (e.g., from a microphone in a handset of a far end participant in the telephone call).

In the communication environment 100 illustrated in FIG. 1, acoustic broadcast signals emitted by the speaker 110 are acoustically coupled to the microphone 105 of a communication device (e.g., a VoIP telephone).

The acoustic coupling results in generation of an echo 125 in the communication environment 100. For example, the far end participant in the telephone call speaks into a handset. The signal is transmitted to the handset of the near end participant present in a room of a home, an office or a lab, etc. The signal emanates from the speaker 110, travels across the room, and contacts walls and other objects in the room. Upon contact, the signal is reflected or coupled directly to the microphone 105 of the near end participant of the telephone call as an echo signal 125, sometimes referred to as an "echo" 125. Such an echo 125 may degrade the perceived voice quality of the call.

To further illustrate, delay in a communication device may occur. The delay, for example, may be caused by voice packetization and local area network (LAN) propagation delays. When the delay is extensive, e.g., 150 ms or more, the echo 125 resulting from the acoustic coupling becomes audible to the far end participant of the telephone call, thereby detracting from the voice quality of the telephone call. Better voice quality may be realized by squashing the echo 125 generated from the acoustic coupling in the communication environment 100.

Further, in order to cancel the echo 125 in the communication environment 100, it becomes important to predict an echo estimate of the echo 125 associated with the near end signal 115 and the far end signal 120, respectively. The echo estimate generally refers to an estimate of a measure of anticipated echo prior to receipt of the echo, i.e., echo signal, at a point in time. The estimate may be based on various data/information gathered during the telephone call. For example, the data/information may include determination of various conditions and states, as well as transitions between states, of the telephone call. The conditions include, for example, single talk and double talk. Single talk refers to a condition where only one participant of the telephone call is speaking. Double talk refers to a condition where two or more participants of the telephone call are speaking at the same time. Thus, in the condition of single talk, the signal typically includes the speaker's voice and possibly an echo, background noise, or a combination of the same.

In a condition of double talk, the signal typically includes both speakers' voices and possibly one or more echoes, background noise, or a combination of the same. An echo estimate is designed to cancel the echo portion of the call, thus subtracting out the speaker's voice portion, thus it is important to ascertain whether the single talk or double talk is ongoing and which portions of the near end signal are representative of echo and the near end user (along with his/her background noise) in order to estimate the echo or echoes and to optimize cancellation of the echo. The echo estimate is then used to cancel the echo.

Further, inherent in the nature of telephone calls are states, including, for example, a transient state and a steady state. The transient state refers to a state when the call is first placed but before enough time has elapsed to generate enough data/information from which an echo estimate and/or other determinations and calculations may be made or to transitioning states between steady states. The steady state refers to a state after the transient state, where enough information/data has been generated by the call to begin formulating estimates and taking state machine decisions based on the same, etc.

In addition, when the call is in the steady state, a number of substates may exist. These substates are sometimes referred to as "DADS states", and are explained in greater detail hereinafter. It is also important to determine which DADS state(s) exist at a point in time in the call or whether transition(s) between the DADS states are occurring. As actions taken to estimate an echo and further improve the quality of the call in other ways are sometimes dependent on the state, the DADS state, and/or the transition between DADS states, it is important to ascertain these dependencies and to estimate the echo as accurately and as quickly as possible and take appropriate action.

With respect to the background noise, a reasonable amount of background noise may be intentionally left or even injected in a communication to give a speaking participant of the telephone call assurance that the call has not been dropped. Otherwise, in the absence of any background noise whatsoever, i.e., silence, the speaking participant may mistakenly conclude that the call has been dropped when, in fact, the listening participant is simply silent and no background noise is discernible to the speaking participant as a cue of call continuation. Such a conclusion may result in the speaking participant seeking reassurance of the presence of the listening participant, which can be disruptive to normal telephone conversations. This reasonable amount of background noise is commonly known as comfort noise.

Figure 2:
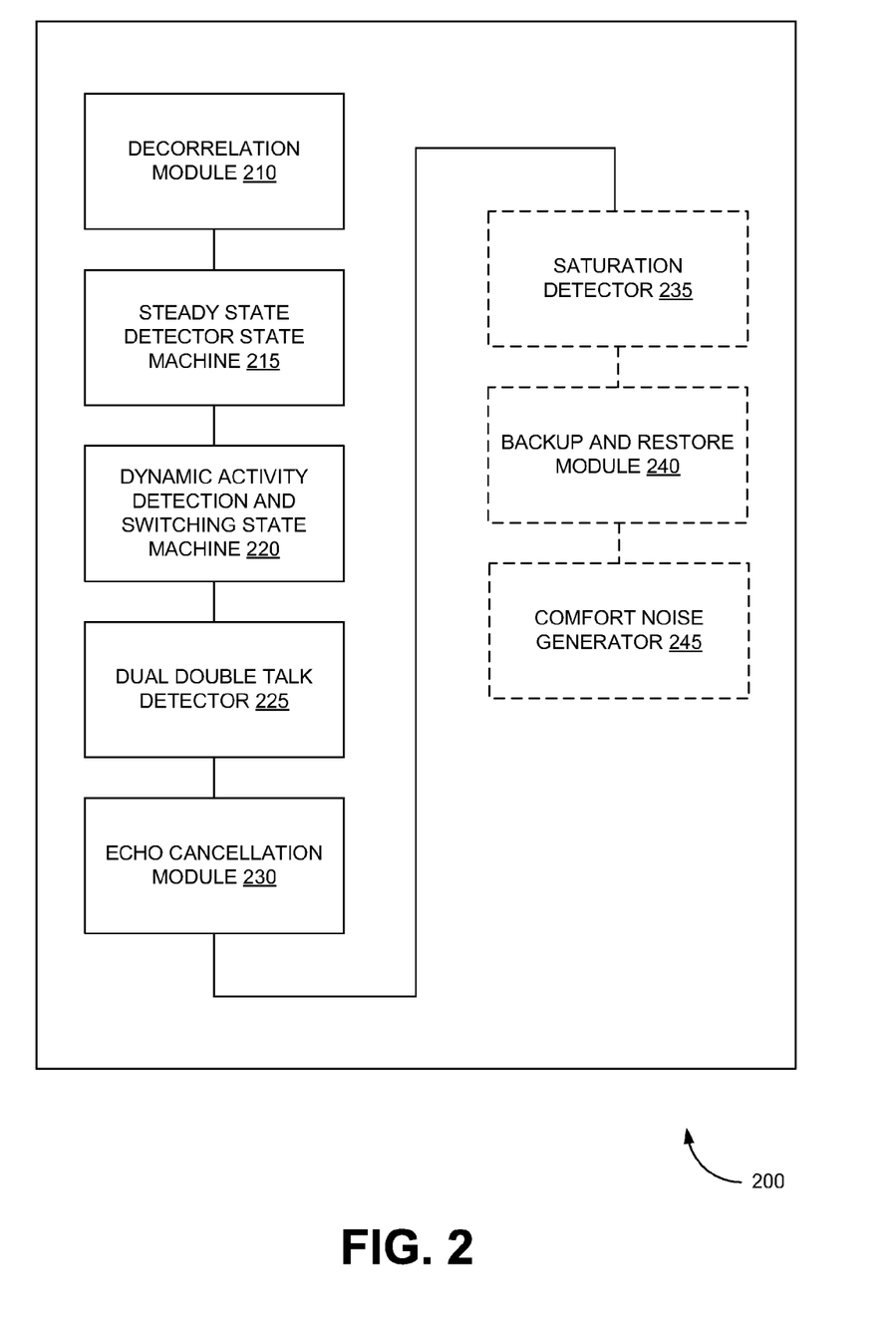
FIG. 2 illustrates a linear full duplex system, according to one embodiment.

FIG. 2 illustrates a linear full duplex system 200, according to one embodiment. Particularly, FIG. 2 illustrates a decorrelation module 210, a steady state detector state (SSD) machine 215, a dynamic activity detection and switching (DADS) state machine 220, a dual double talk detector 225, an echo cancellation module 230, a saturation detector 235, a backup and restore module 240 and a comfort noise generator 245.

Figure 5:
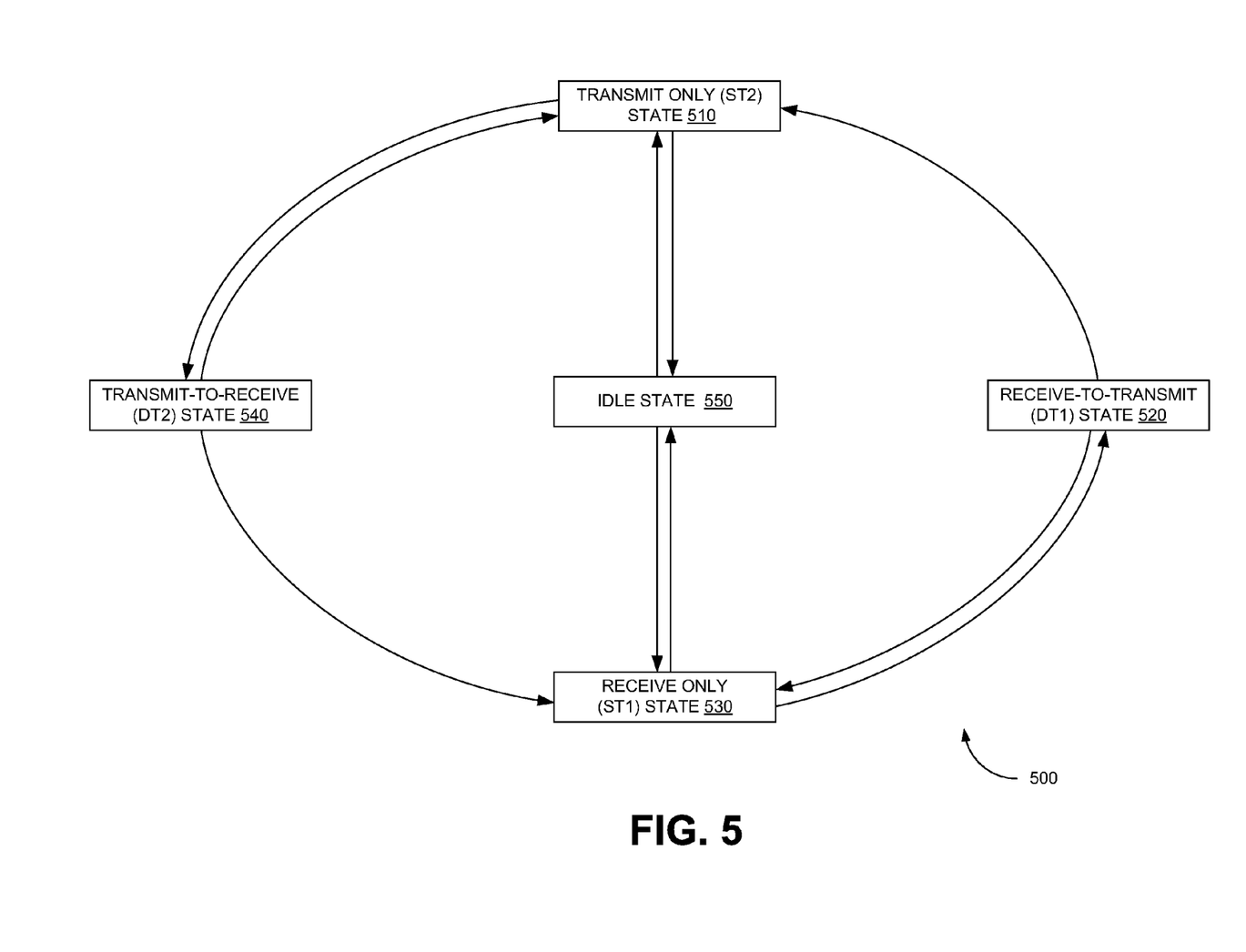
FIG. 5 illustrates DADS states and transitions between the DADS states during the steady state of the communication associated with DADS, according to one embodiment.

The decorrelation module 210 refines a far end signal 120 and a residual echo associated with the communication. The SSD state machine 215 detects any one of a steady state or a transient state associated with the communication. The DADS state machine 220 dynamically detects at least one internal substate of internal substates associated with the communication, if the communication is in the steady state. Further, the DADS state machine 220 dynamically detects a transition between the internal substates and switches between the internal substates during the steady state. Exemplary substates include a receive only state, a transmit only state, a receive-to-transmit state, a transmit-to-receive state and an idle state (e.g., as illustrated in FIG. 5). The receive only state, the transmit only state, the receive-to-transmit state, the transmit-to-receive state and the idle state are sometimes referred to as "ST1 state", "ST2 state", "DT1 state", "DT2 state" and "IDLE state", respectively.

Further, the dual double talk detector 225 detects and manages double talk associated with the communication. The dual double-talk detector 225 uses a combination of correlation and power estimates to detect and manage the double talk conditions. The echo cancellation module 230 includes an echo estimation module (e.g., the echo estimation module 305 of FIG. 3) and an adaptive filter module (e.g., the adaptive filter module 320 of FIG. 3). The echo estimation module 305 calculates an echo estimate of echo 125, which is subtracted from the near end signal 115 by the echo subtraction module 310 to yield a residual echo associated with the communication. The adaptive filter module 320 updates an echo estimate of the echo 125 associated with the communication based on the far end signal 120. In some embodiments, the adaptive filter module 320 updates, based on the refined far end signal and a refined residual signal, the adaptive filter module 320 used for the echo estimation. The saturation detector 235 detects saturation (e.g., at node A and node B illustrated in FIG. 3) associated with the communication and disables the adaptive filter module 320 updates upon detection of the saturation. This helps in making the filter updates robust to digital saturation of speech signal.

The backup and restore module 240 backs up filter coefficients associated with the echo estimation module 305 and restores the filter coefficients for use with the echo estimation module 305 based on decision of the DADS state machine 220. The comfort noise generator 245 generates a spectrally-matched comfort noise and mixes the comfort noise with the residual echo 315 when $G_{res}$ (i.e., residual echo after amplification) is non-zero attenuation. The comfort noise, to some extent, also masks the residual echo that may have been left after the echo subtraction is over. The above-described system 200 is inherently fully duplex and fully linear thereby avoiding the use of nonlinear modules or processing to remove the residual echo.

Figure 3:
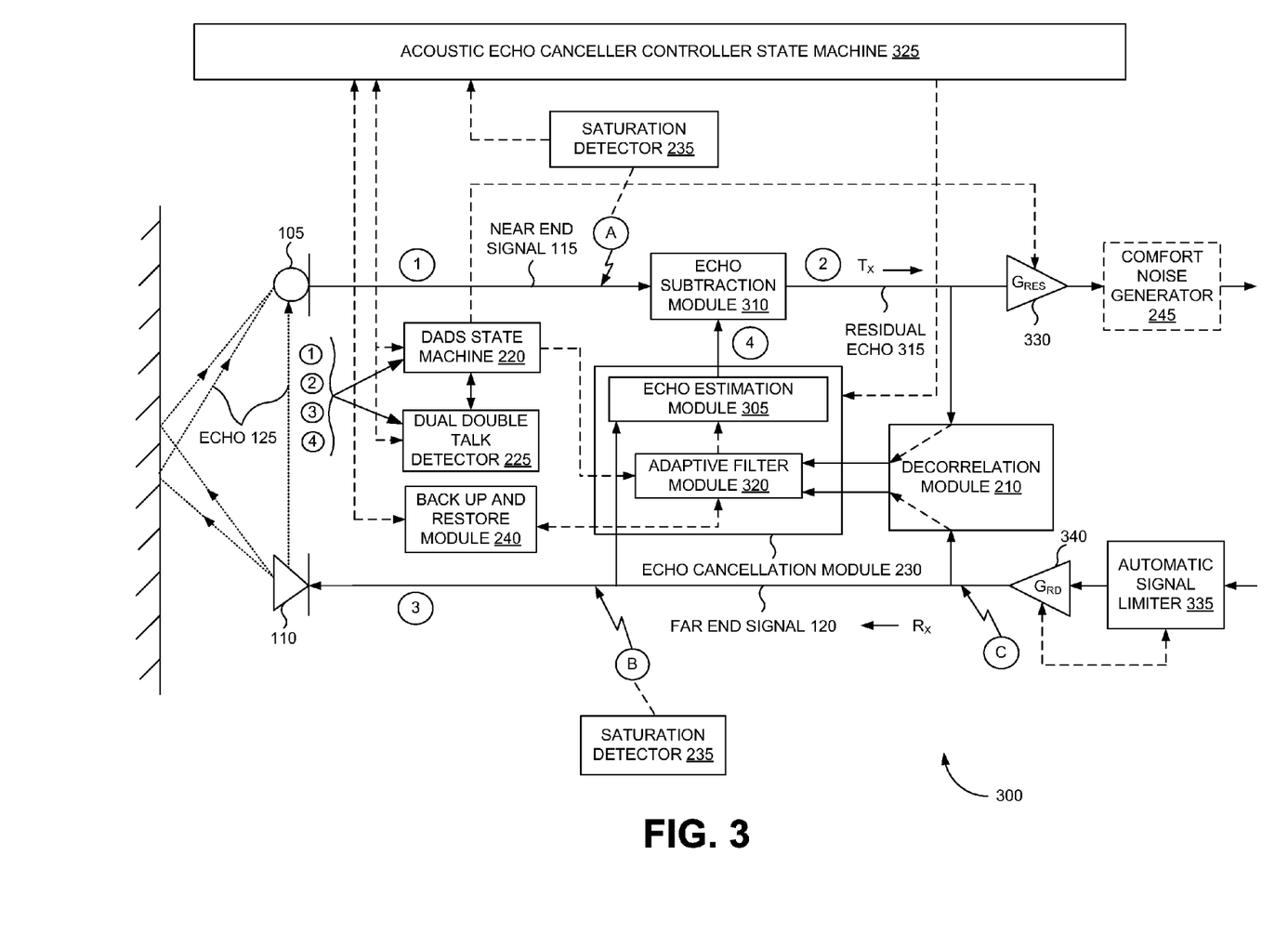
FIG. 3 illustrates a fully linear acoustic echo cancellation technique using the various components of the linear full duplex system of FIG. 2, according to one embodiment.

FIG. 3 illustrates a fully linear acoustic echo cancellation technique using the various components of the linear full duplex system 200 of FIG. 2, according to one embodiment. Particularly, FIG. 3 illustrates the microphone 105, the speaker 110, the near end signal 115, the far end signal 120, the echo 125, the decorrelation module 210, the DADS state machine 220, the dual double talk detector 225, the echo cancellation module 230 including an echo estimation module 305 and an adaptive filter module 320, the saturation detector 235, the backup and restore module 240, the comfort noise generator 245, a echo subtraction module 310, a residual echo 315, an acoustic echo canceller controller state machine 325, a gain amplifier ($G_{res}$) 330, an automatic signal limiter 335 and $G_{rd}$ 340.

FIG. 3 in particular illustrates a method for cancellation of the acoustic echo 125 generated in the communication environment 100. In operation, the decorrelation module 210 refines the far end signal 120 associated with communication for more robust filter updates in module 320. For example, the far end signal 120 may be a source of acoustic echo 125 in the communication environment 100. In some embodiments, based on the far end signal 120, an echo estimate of the echo 125 associated with the communication is updated via the adaptive filter module 320. For example, the echo estimate refers to an estimate of a measure of anticipated echo prior to receipt of the echo 125, i.e., echo signal, at a point in time.

The echo estimation module 305 calculates the residual echo 315 associated with the communication. In some embodiments, the residual echo 315 is calculated after subtraction of the echo estimate of the echo 125 from the near end signal 115 associated with the communication. In these embodiments, the echo subtraction module 310 subtracts the echo 125 from the near end signal 115 based on the echo estimate to cancel the echo 125 associated with the communication. Further, the decorrelation module 210 refines the residual echo 315 associated with the communication for more robust, faster filter updates in module 320. In accordance with one or more embodiments described above, the adaptive filter module 320 updates the adaptive filter module 320 used for the echo estimation, based on the refined far end signal and the refined residual signal.

Further, as shown in FIG. 3, the DADS state machine 220 dynamically detects at least one internal substate, a transition between the internal substates and switching between the internal substates when the communication is in the steady state (e.g., detected by the SSD state machine 215. For example, the internal substates include the ST2 state, the DT1 state, the ST1 state, the DT2 state, the IDLE state. The internal substates associated with the communication are explained in greater detail in FIG. 5. Also, the dual double talk detector 225 detects and manages double talk associated with the communication.

The acoustic echo canceller controller state machine 325 shown in FIG. 3 manages activities of the decorrelation module 210, the DADS state machine 220, the dual double talk detector 225, the echo estimation module 305, the echo subtraction module 310, the saturation detector module 235 and the adaptive filter module 320 to enable full duplex and fully linear communication (and not risking echo leakage during communication). In these embodiments, the acoustic echo canceller controller state machine 325 enables and changes an intensity of adaptation of the adaptive filter module 320 depending on the current state of the DADS state machine 220 and a decision of the dual double talk detector and removes the echo 125 based on the detected transition between the internal substates. The above-described communication environment executes the echo cancellation module 230 in absence of a non linear processor (NLP) and hence ensures effective echo cancellation while achieving fully duplex communication in a purely linear manner.

For example, the communication environment illustrated in FIG. 3 efficiently cancels the echo 125 using the echo cancellation module 230 and provides a full duplex communication (e.g., achieved without using the NLP) when the communication is in steady state (e.g., detected using the SSD state machine 215); in any of the internal substates (including the ST2 state, the DT1 state, the ST1 state, the DT2 state, the IDLE state) i.e., during double talk as well as single talk situations. For example, each state defines the maximum and minimum values of $G_{res}$ that attenuates the residual echo 315 (obviating the need of using an NLP)

Referring to FIG. 3, in some embodiments, saturation associated with the communication in the near end signal 115 and the far end signal 120 is detected through the saturation detector 235. The term "saturation" generally refers to an input signal that is too large to be transmitted without distortion (e.g., when the speaking participant of the telephone call is speaking very loudly or shouting into the microphone of the handset). For example, the saturation is detected in the far end signal 120 when the far end signal 120 includes $G_{rd}$ 340 (i.e., receive digital gain) applied to the far end signal 120. In one embodiment, an automatic signal limiter 335 enhances robustness of the linear duplex system 200 by ensuring that the far end signal 120 is constrained to lie within prescribed maximum and minimum values. In these embodiments, the saturation detection associated with the near end signal 115 is carried out before subtraction of the echo estimate from the near end signal 115. Further, in these embodiments, updates to the adaptive filter module 320 are disabled by the acoustic echo canceller controller state machine 325 upon detection of the saturation. In this manner, portions of the signal susceptible to saturation would not impact adaptive filter convergence or stability.

In one embodiment, the saturation detection accommodates saturation of the echo signal 125 during a single talk (ST1 substate) on a transmission side (Tx) (i.e., at node A illustrated in FIG. 3) to result in better filter stability under high transmit path gains or low/negative ERL conditions. In another embodiment, the saturation detection accommodates saturation of the far end signal 120 (e.g., at node B as illustrated in FIG. 3) to result in better stability under loud far end signal conditions. In yet another embodiment, the saturation detection enables better adaptive signal limiting (e.g., as illustrated at node C in FIG. 3) which avoids non-linearity in the far end signal 120 by adding attenuation to the far end signal at node C in FIG. 3 (which lies outside the echo path).

Further as shown in FIG. 3, the gain amplifier 330 applies linear attenuation to the residual echo 315 based on the current DADS state and hangover associated with the transition. For example, attenuation applied to the residual echo 315, is purely linear (e.g., as attenuation is applied in the absence of NLP). In some embodiments, the comfort noise generator 245 generates spectrally-matched comfort noise and mixes the comfort noise with the residual echo 315 after applying linear attenuation. In these embodiments, the spectrally-matched comfort noise is mixed with residual echo 315 when the $G_{res}$ 330 is non-zero attenuation. In one embodiment, the comfort noise generator 245 monitors the IDLE state (DADs substate), which essentially marks periods of near end silence, and estimates the silence description in terms of LPC coefficients and power estimates that can be used to reconstructs the same type (perceptually) and level of background noise when needed. In some embodiments, a pre-configured or level matched (and not spectrally matched) comfort noise is generated by the comfort noise generator 245 based on the current DADS state.

The backup and restore module 240 interfaces with the adaptive filter module 320 to backs up filter coefficients associated with the echo estimation module 305 and to restore the filter coefficients for use with the echo estimation module 305. In some embodiments, the backup and restore operations are performed based on the decision of the DADS state machine. For example, the filter coefficients are backed up when an echo return loss enhancement (ERLE) is above a threshold echo return loss enhancement (TERLE 2). In addition, the filter coefficients are backed up when the internal substate is the ST1 state for a predetermined time. Further, the filter coefficients are backed up when no saturation is detected in the near end signal 115 and the far end signal 120. Alternatively, the filter coefficients are restored based on a filter update flag (e.g., determined using the double talk detector 225) and based on correlation computations (i.e., the correlation based detector 420 is used for restore decisions). In some embodiments, the ERLE estimates are used for restore decision of the backed up filter coefficients. In these embodiments, associated hangovers are updated before the filter coefficients are restored. Although, the decorrelation module 210 make divergence less likely, back up and restore feature helps to avoid howling scenarios that are usually a result of divergence.

For example, during the steady state, backup of filter coefficients are kept, in case of divergence setting in (e.g., under non-ideal conditions like far end saturation and unfriendly Echo Return Loss (ERL) paths) such that backup coefficients can be used and updates may be temporarily frozen. Further, the DADS states allow the filter to adapt for a short duration during double talk and during substate transitions. The backup and restore module 240 ensures that this does not result in any instability to the filter updates. Along with the decorrelation module 210 and the DADs, the backup and restore module 240 helps ensure a smooth operation without a non-linear processor (NLP). In this manner, full duplex communication is achieved in a fully linear manner and without the side effects sometimes observed in non-linear components, e.g., poor audio quality such as choppy speech.

Figure 4A:
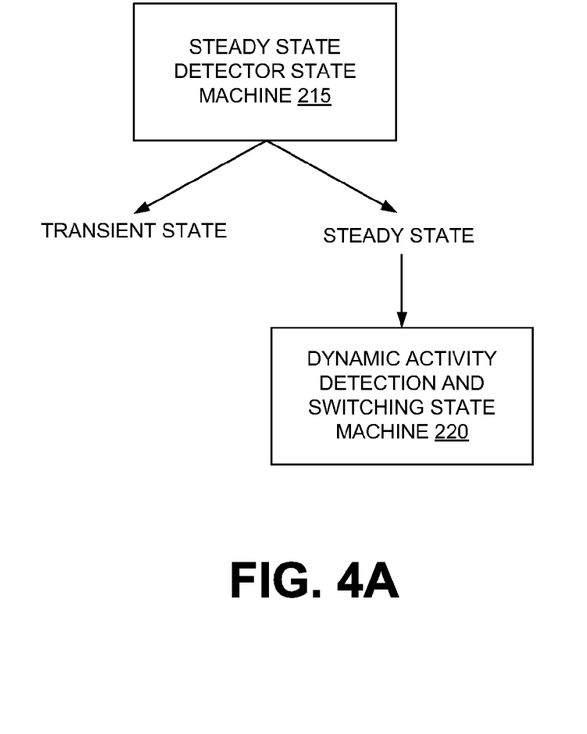
FIG. 4A illustrates the steady state detector (SSD) state machine and the dynamic activity detection and switching (DADS) state machine of the linear full duplex system of FIG. 2, according to one embodiment.

FIG. 4A illustrates the SSD state machine 215 and the DADS state machine 220 of the linear full duplex system of FIG. 2, according to one embodiment. The SSD state machine 215 determines whether a communication is in a transient state or a steady state. The SSD state machine 215 may determine the state based on an echo return loss enhancement (ERLE) estimate for echo cancellation and associated with a hangover over which the ERLE is consistently maintained above a threshold (TERLE1).

If the steady state is detected, the DADS state machine dynamically detects at least one internal substate, transition between the internal substates and switching between the internal substates. In these embodiments, the DADS state machine 220 adapts with a normal rate of adaptation during the steady state and in the ST1 state 530, adapts with a slow rate of adaptation during the steady state and in the DT1 state 520 or the DT2 state 540, avoids adaptation during the steady state and in the ST2 state 510 and the IDLE state 550, and executes the DADS state machine 220 when the steady state is detected.

The DADS state machine 220 dynamically detects transition between the internal substates 500 when the call is in the steady state and switches between the internal states so that appropriate actions (e.g., cancellation of echo, etc.) in the echo cancellation module 230 are performed to ensure full duplex communication in a fully linear manner. For example, these internal substate transitions are detected based on power computations and correlation computations, computed via a power based detector and a correlation based detector, respectively (e.g., as illustrated in FIG. 4B).

Figure 4B:
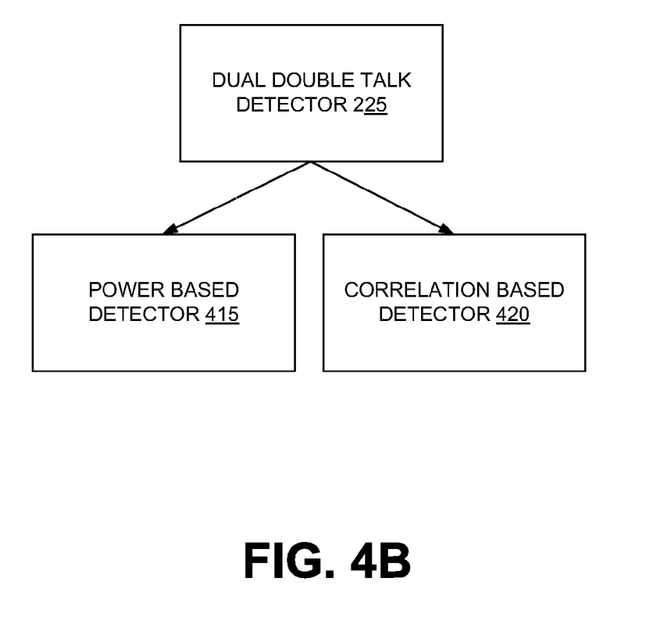
FIG. 4B illustrates the dual double talk detector of the linear full duplex system of FIG. 2, according to one embodiment.

FIG. 4B illustrates the dual double talk detector 225 of the linear full duplex system 200 of FIG. 2, according to one embodiment. A power based detector 415 computes power computations of a maximum power of the far end signal 120 over a double talk detection window across a tail length duration. A correlation based detector 420 computes correlation computations of a correlation between the echo estimate from the echo estimation module 305 (marked 4 in FIG. 3) and the near end signal 115; and the correlation between the residual echo 315, after the echo estimate is subtracted (e.g., using the echo subtraction module 310 of FIG. 3) from the near end signal 115, and the near end signal 115.

In some embodiments, the correlation based detector 420 is used during the steady state and turned off during the transient state of the communication. The detectors, viz. the power based detector 415 and the correlation based detector 420 help in better performance of the dual double talk detector 225 such that double talk associated with the communication is detected and managed efficiently.

Further, the presence of double talk is determined based on the power computations and the correlation computations via the acoustic echo canceller controller state machine 325 as illustrated in FIG. 3. In some embodiments, the presence of double talk is indicated based on history decisions associated with the power computations and the correlation computations of the dual double talk detector. In these embodiments, the history decisions are combined using smart decision rules with instantaneous power computations and correlation computations to determine whether double talk exists or not; whether to perform restoration of the backed up filter coefficients to the working filter (e.g., the decorrelation module 210); whether to update the adaptive filter module 320 or not and/or whether to apply the $G_{res}$ to the residual echo 315 or not.

In one embodiment, the determination can be used to override a hangover via the acoustic echo canceller controller state machine 325 and cause a faster transition between a single talk state and a double talk state (e.g., via the acoustic echo canceller controller state machine. For example, each internal substate has an associated hangover. The hangover associated with each internal substate transition provides an inertia before any transition is made, as the internal substates do not oscillate randomly. These hangovers are tuned, based on dynamics of echo perception and additional checks are made to ensure that the hangovers can be overridden to cause faster ore slower transitions. Further, it can be noted that overriding of hangovers ensures full duplex performance and avoids clipping of start/end of syllables between transitions from single talk and double talk states.

FIG. 5 illustrates DADS states 500 and transitions between the DADS states 500 during the steady state of the communication associated with DADS, according to one embodiment. Particularly, FIG. 5 illustrates a ST2 state 510, a DT1 state 520, a ST1 state 530, a DT2 state 540 and an IDLE state 550.

For example, the ST2 state 510, the DT1 state 520, the ST1 state 530, the DT2 state 540 and the IDLE state 550 occur when a Voice over Internet Protocol (VoIP) call is in a transmit only mode, a receive-to-transmit mode, a receive only mode, a transmit-to-receive mode and an idle mode, respectively. It may be understood to one skilled in the art that transition between any of the internal substates 500 may occur during the communication. Also, it can be noted that the transitions are gradual and not instantaneous in terms of $G_{res}$ attenuation (i.e., the rate based on which the state transition is happening).

In some embodiments, the DADS state machine 220 dynamically detects the transition between the internal substates 500 and switches between the internal substates 500 during the steady state. In these embodiments, during the steady state of the communication, the DADS state machine 220 adapts with a normal rate of adaptation when the communication is in the ST1 state 530, adapts with a slow rate of adaptation when the communication is in either the DT1 state 520 or the DT2 state 540 or avoids adaptation when the communication is in either the ST2 state 510 or the IDLE state 550. In addition, the DADS state machine 220, during at least one of a transition to the ST1 state 530 and a transition from the ST1 state 530, adapts with a normal rate of adaptation during single talk and avoids adaptation during double talk.

In some embodiments, faster transitions between ST2 state 510 and ST1 state 530 are allowed when the DADS state machine 220 dynamically detects the presence of the IDLE state 550. The DADS state machine 220 helps in providing full duplex communication in a linear manner through dynamically detecting transition and switching between the DADS states during the steady state of communication.

Figure 6:
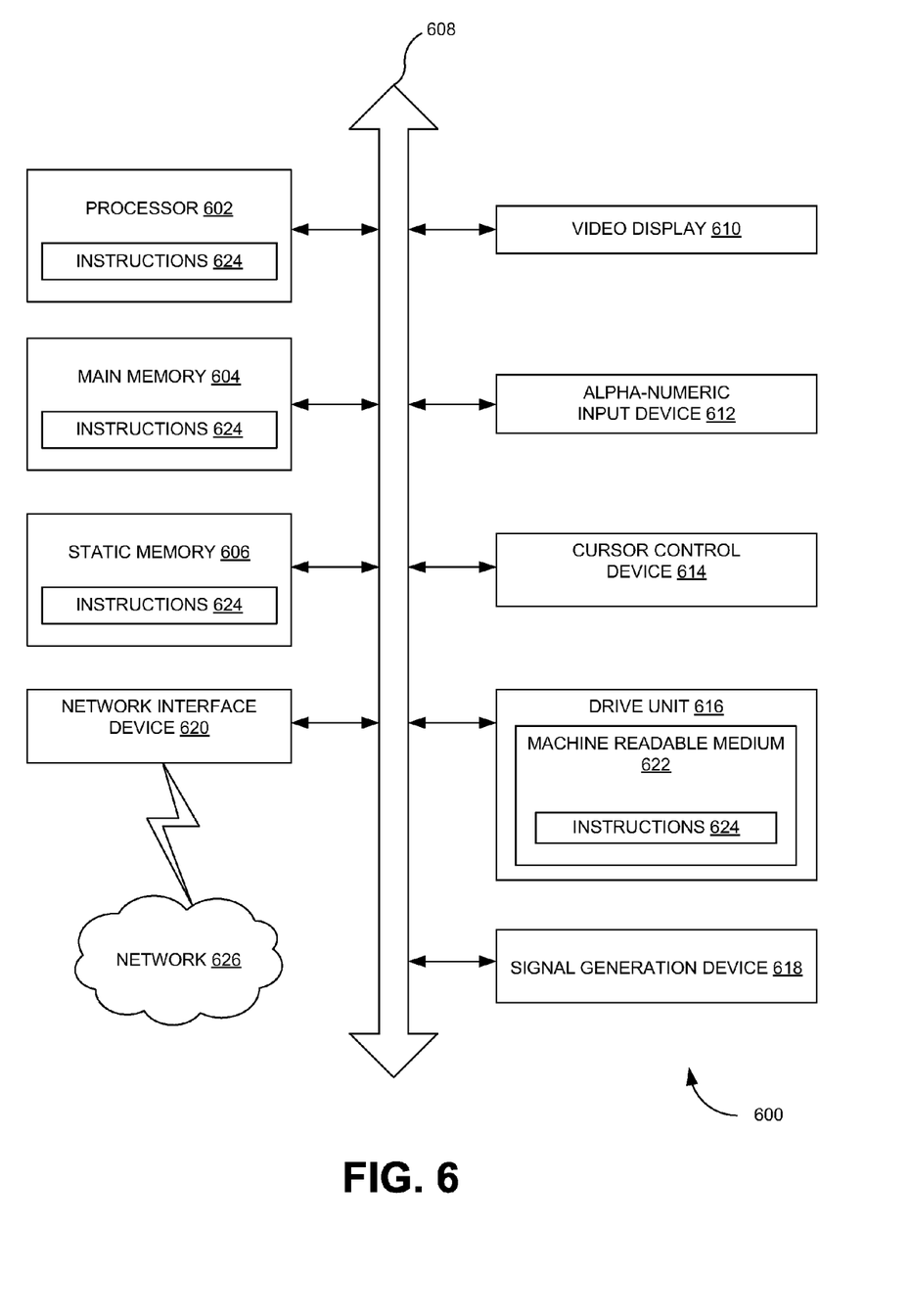
FIG. 6 illustrates a diagrammatic system view of a data processing system in which any of the embodiments disclosed herein may be performed, according to one embodiment.

FIG. 6 illustrates a diagrammatic system view 600 of a data processing system in which any of the embodiments disclosed herein may be performed, according to one embodiment. Particularly, the diagrammatic system view of FIG. 6 illustrates a processor 602, a main memory 604, a static memory 606, a bus 608, a video display 610, an alpha-numeric input device 612, a cursor control device 614, a drive unit 616, a signal generation device 618, a network interface device 620, a machine readable medium 622, instructions 624 and a network 626.

The diagrammatic system view 600 may indicate a personal computer and/or a data processing system in which one or more operations disclosed herein are performed. The processor 602 may be a microprocessor, a state machine, an application specific integrated circuit, a field programmable gate array, etc. The main memory 604 may be a dynamic random access memory and/or a primary memory of a computer system. The static memory 606 may be a hard drive, a flash drive, and/or other memory information associated with the data processing system.

The bus 608 may be an interconnection between various circuits and/or structures of the data processing system. The video display 610 may provide graphical representation of information on the data processing system. The alpha-numeric input device 612 may be a keypad, keyboard and/or any other input device of text (e.g., a special device to aid the physically handicapped). The cursor control device 614 may be a pointing device such as a mouse. The drive unit 616 may be a hard drive, a storage system, and/or other longer term storage subsystem.

The signal generation device 618 may be a bios and/or a functional operating system of the data processing system. The network interface device 620 may perform interface functions (e.g., code conversion, protocol conversion, and/or buffering) required for communications to and from the network 626 between a number of independent devices (e.g., of varying protocols). The machine readable medium 622 may provide instructions on which any of the methods disclosed herein may be performed. The instructions 624 may provide source code and/or data code to the processor 602 to enable any one or more operations disclosed herein.

For example, a fully linear acoustic echo cancellation technique for echo cancellation associated with a full duplex communication includes a first instruction set to a first instruction set to refine, via the decorrelation module 210, a far end signal 120 associated with a communication, a second instruction set integrated with the first instruction set to calculate, via the echo estimation module 305, a residual echo 315 after subtraction of an echo estimate from a near end signal 115 associated with the communication, a third instruction set integrated with the first instruction set and the second instruction set to refine, via the decorrelation module 210, the residual echo 315 associated with the communication, a fourth instruction set integrated with the first instruction set, the second instruction set and the third instruction set to update, based on the far end signal 120 and via the adaptive filter module 320, the echo estimate of an echo 125 associated with the communication, and a fifth instruction set integrated with the first instruction set, the second instruction set, the third instruction set and the fourth instruction set to subtract, via the echo subtraction module 310, the echo 125 from the near end signal 115 based on the echo estimate to cancel the echo 125 associated with the communication.

The acoustic echo cancellation technique further includes a sixth instruction set integrated with the first instruction set, the second instruction set, the third instruction set, the fourth instruction set and the fifth instruction set to detect, via the SSD state machine 215, any one of a steady state and a transient state associated with the communication, a seventh instruction set integrated with the first instruction set, the second instruction set, the third instruction set, the fourth instruction set, the fifth instruction set, and the sixth instruction set to dynamically detect, if in a steady state and via the DADS state machine 220, at least one internal substate of the internal substates associated with the communication, and an eighth instruction set integrated with the first instruction set, the second instruction set, the third instruction set, the fourth instruction set, the fifth instruction set, the sixth instruction set and the seventh instruction to, during the steady state, dynamically detect, via the DADS state machine, a transition between the internal substates and switching between the internal substates.

In addition, the acoustic echo cancellation technique includes a ninth instruction set integrated with the first instruction set, the second instruction set, the third instruction set, the fourth instruction set, the fifth instruction set, the sixth instruction, the seventh instruction set, and the eighth instruction set to detect and manage, via the dual double talk detector 225, double talk associated with the communication.

The acoustic echo cancellation technique also includes a tenth instruction set integrated with the first instruction set, the second instruction set, the third instruction set, the fourth instruction set, the fifth instruction set, the sixth instruction, the seventh instruction set, the eighth instruction set and the ninth instruction set to update, via the adaptive filter module 320 and based on the refined far end signal 120 and a refined residual signal, the adaptive filter module 320 used for the echo estimation.

The acoustic echo cancellation technique includes an eleventh instruction set integrated with the first instruction set, the second instruction set, the third instruction set, the fourth instruction set, the fifth instruction set, the sixth instruction, the seventh instruction set, the eighth instruction set, the ninth instruction set, and the tenth instruction set to enable and change, via the acoustic echo canceller controller state machine 325, an intensity of adaptation of the adaptive filter module 320 depending on a current state of the DADS state machine 220 and a decision of the dual double talk detector 225, and to remove, via the acoustic echo canceller controller state machine 325, the residual echo 315 based on the detected transition between the internal substates, and a twelfth instruction set integrated with the first instruction set, the second instruction set, the third instruction set, the fourth instruction set, the fifth instruction set, the sixth instruction, the seventh instruction set, the eighth instruction set, the ninth instruction set, the tenth instruction set, and the eleventh instruction set to manage, via the acoustic echo canceller controller state machine 325, activities of the echo subtraction module 310, the echo estimation module 305, the adaptive filter module 320, the DADS state machine 220, the dual double talk detector 225, and the decorrelation module 210 to enable full duplex and fully linear communication.

Further, the acoustic echo cancellation technique includes a thirteenth instruction set to detect, via the saturation detector 235, saturation associated with the communication and to disable, via the acoustic echo canceller controller state machine 325, the adaptive filter module 320 updates upon detection of the saturation, a fourteenth instruction set to back up, via the backup and restore module 240, filter coefficients associated with the echo estimation module 305 and to restore the filter coefficients for use with the echo estimation module 305, based on the decision of the DADS state machine 220, and a fifteenth instruction set to generate, via the comfort noise generator 245, a spectrally-matched comfort noise and to mix the comfort noise with the residual echo 315.

Figure 7A:
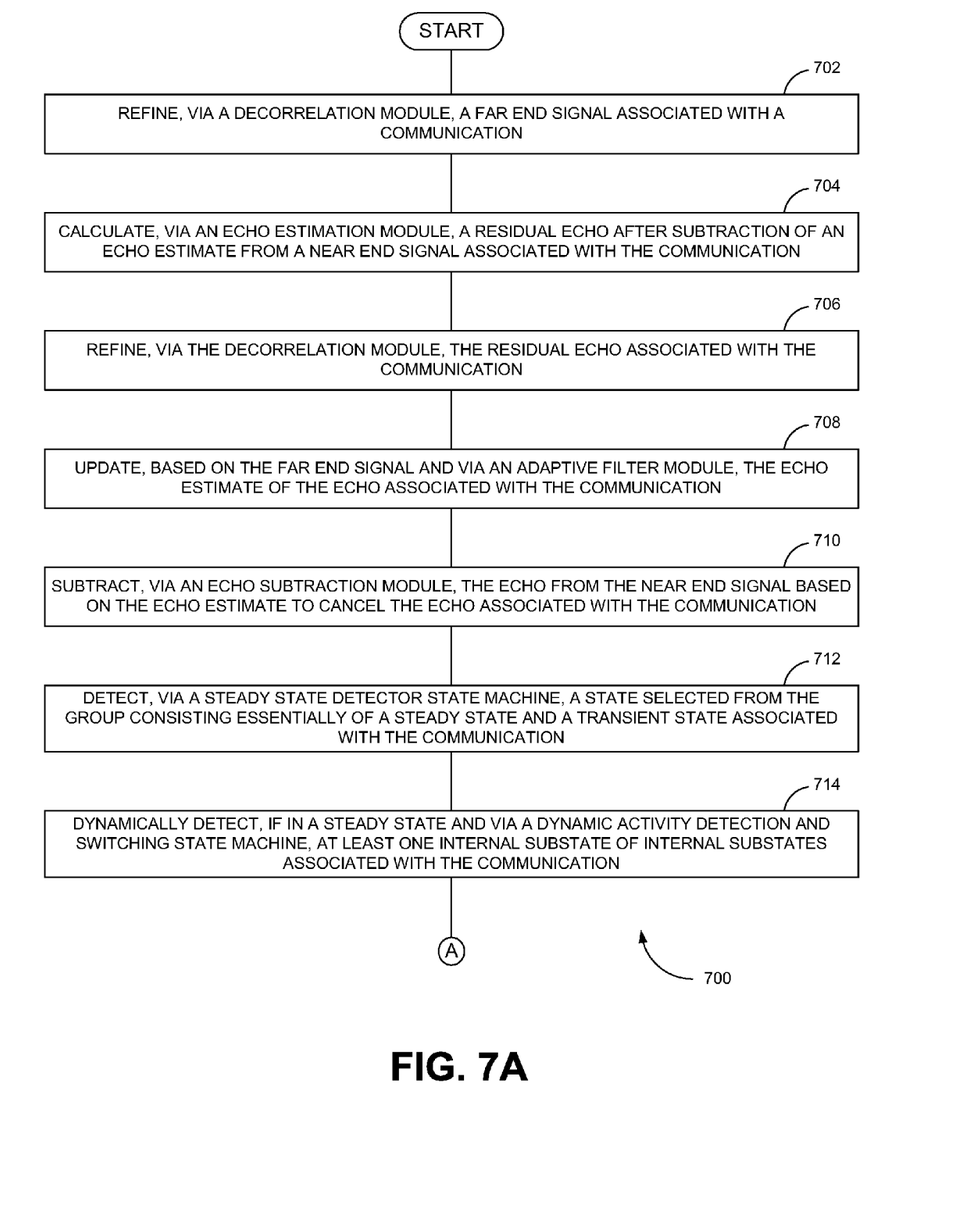
FIG. 7A is a process flow of a linear full duplex method, according to one embodiment.

FIG. 7A is a process flow 700 of a linear full duplex method, according to one embodiment. In operation 702, a far end signal 120 associated with a communication is refined via a decorrelation module 210. In operation 704, residual echo 315 is calculated via an echo estimation module 305, after subtraction of an echo estimate from a near end signal 115 associated with the communication. In operation 706, the residual echo 315 associated with the communication is refined via the decorrelation module 210.

In operation 708, the echo estimate of an echo 125 associated with the communication is updated based on the far end signal 120 via an adaptive filter module 320. In operation 710, the echo 125 is subtracted from the near end signal 115 via an echo subtraction module 310 based on the echo estimate to cancel the echo 125 associated with the communication. In operation 712, any one of a steady state or a transient state associated with the communication is detected via a SSD state machine 215. In operation 714, an internal substate of internal substates associated with the communication is dynamically detected via a DADS state machine 220, if the communication is in steady state.

Figure 7B:
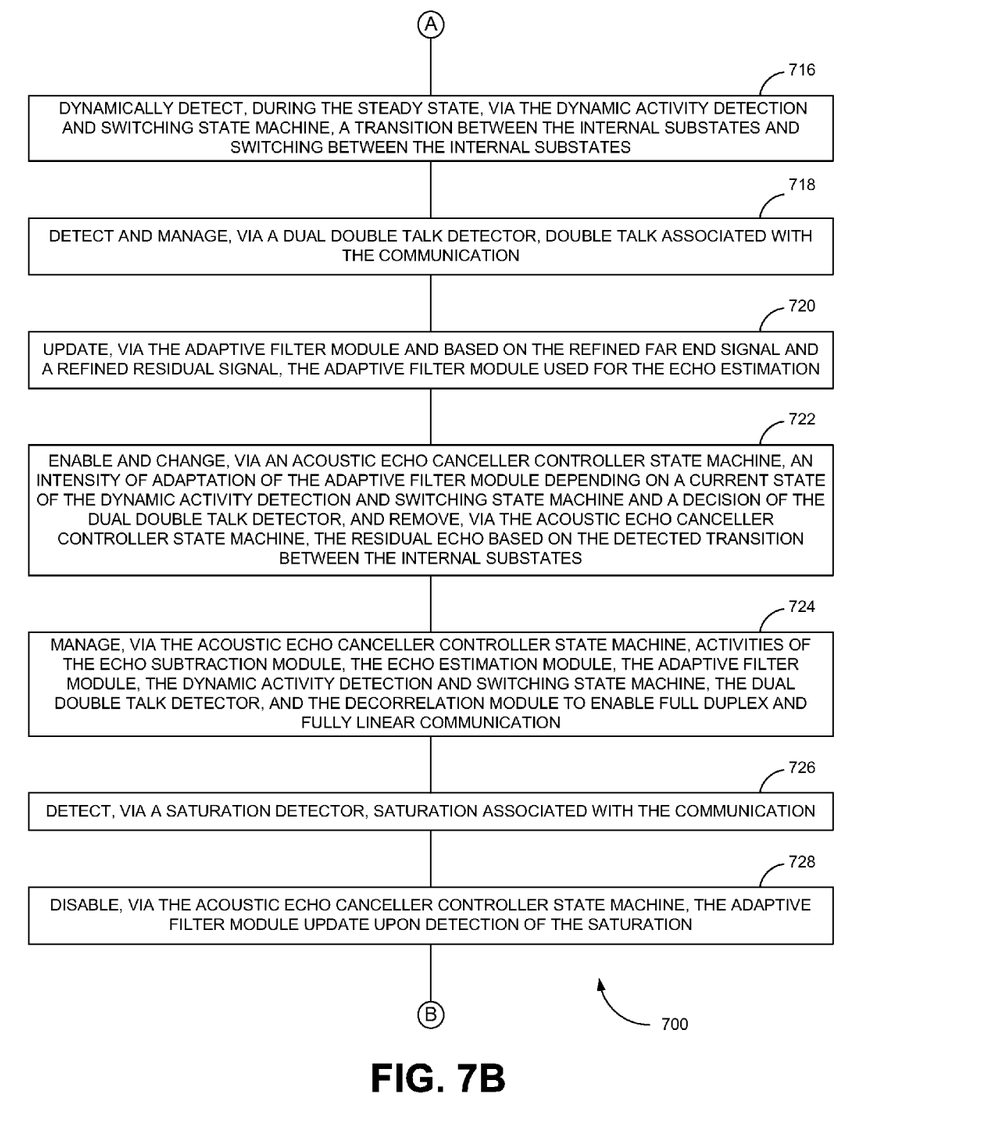
FIG. 7B is a continuation of the process flow of FIG. 7A, illustrating additional processes, according to one embodiment.

FIG. 7B is a continuation of the process flow of FIG. 7A, illustrating additional processes, according to one embodiment. In operation 716, a transition between the internal substates is dynamically detected and switched between the internal substates during the steady state via the DADS state machine 220. In operation 718, double talk associated with the communication is detected and managed via a dual double talk detector 225. In operation 720, the adaptive filter module 320 used for echo estimation is updated based on the refined far end signal and refined residual signal via the adaptive filter module 320. In operation 722, an intensity of adaptation of the adaptive filter module 320 is enabled and changed, via an acoustic echo canceller controller state machine 325, depending on a current state of the DADS state machine 220 and a decision of the dual double talk detector 225, and the residual echo 315 is removed based on the detected transition between the internal substates via the acoustic echo canceller controller state machine 325.

In operation 724, activities of the echo subtraction module 310, the echo estimation module 305, the adaptive filter module 320, the DADS state machine 220, the dual double talk detector 225, saturation detector 235 and the decorrelation module 210 are managed via the acoustic echo canceller controller state machine 325 to enable full duplex and fully linear communication. In operation 726, saturation associated with the communication is detected via a saturation detector 235. In operation 728, the adaptive filter module update is disabled via the acoustic echo canceller controller state machine 325 upon detection of the saturation.

Figure 7C:
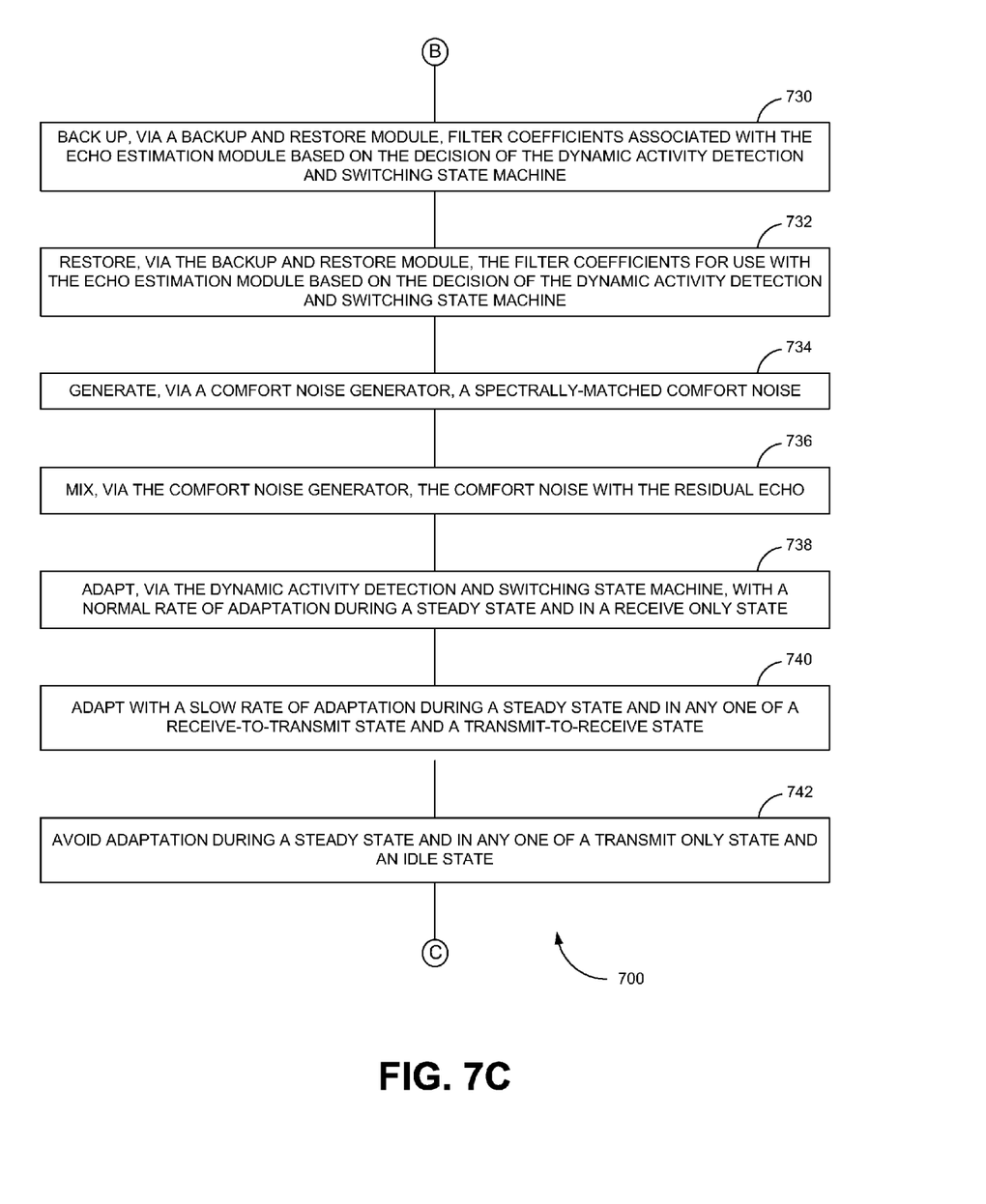
FIG. 7C is a continuation of the process flow of FIG. 7B, illustrating additional processes, according to one embodiment.

FIG. 7C is a continuation of the process flow of FIG. 7B, illustrating additional processes, according to one embodiment. In operation 730, filter coefficients associated with the echo estimation module 305 are backed up, via a backup and restore module 240, based on decision of the DADS state machine 220. In operation 732, the filter coefficients for use with the echo estimation module 305 are restored, via the backup and restore module 240, based on the decision of the DADS state machine 220. In operation 734, a spectrally-matched comfort noise is generated via a comfort noise generator 245. In operation 736, the comfort noise is mixed with the residual echo 315 via the comfort noise generator 245.

In operation 738, adaptation with a normal rate is being performed, via the DADS state machine 220, during a steady state and in a receive only (ST1) state. In operation 740, adaptation with a slow rate is being performed during a steady state and in a substate including any one of a receive-to-transmit (DT1) state and a transmit-to-receive (DT2) state. In operation 742, adaptation is avoided during a steady state and in a substate including any one of a transmit only (ST2) state and an idle state 550.

Figure 7D:
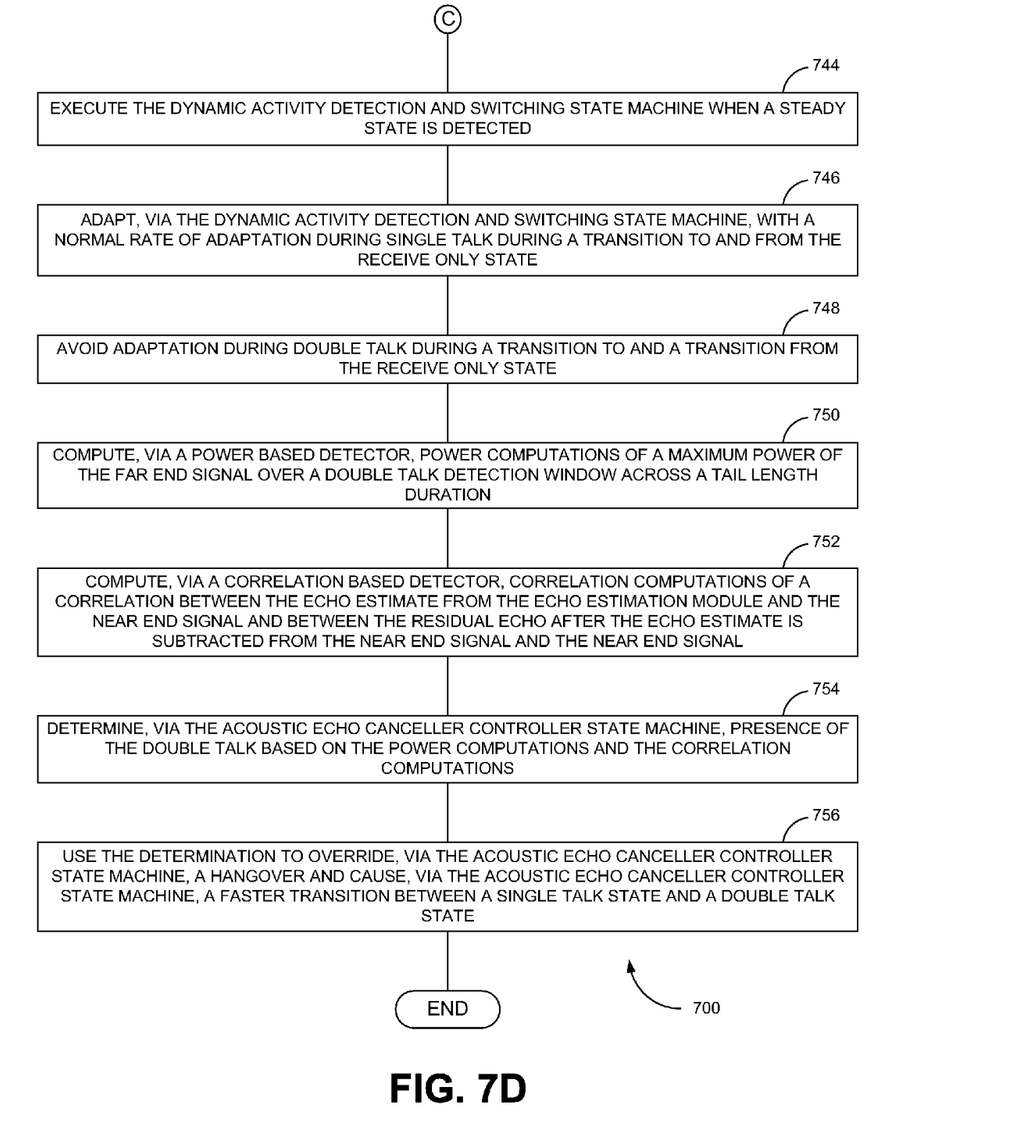
FIG. 7D is a continuation of the process flow of FIG. 7C, illustrating additional processes, according to one embodiment.

FIG. 7D is a continuation of the process flow of FIG. 7C, illustrating additional processes, according to one embodiment. In operation 744, the DADS state machine 220 is executed when a steady state is detected. In operation 746, adaptation with a normal rate is being performed via the DADS state machine 220 during single talk and during a transition to and from a receive only (ST1) state. In operation 748, adaptation is avoided during double talk and during transition to and from a receive only (ST1) state. In operation 750, power computations of a maximum power of the far end signal 120 is computed via a power based detector 415 over a double talk detection window across a tail length duration.

In operation 752, correlation computations of a correlation between the echo estimate from the echo estimation module 305 and the near end signal 115 and between the residual echo 315 after the echo estimate is subtracted from the near end signal 115 and the near end signal 115 are computed via a correlation based detector 420. In operation 754, presence of the double talk is determined based on the power computations and the correlation computations via the acoustic echo canceller controller state machine 325.

In operation 756, the determination is used to override a hangover and cause a faster transition between a single talk state and a double talk state via the acoustic echo canceller controller state machine 325. The process 700 described above (in FIGS. 7A, 7B, 7C and 7D) is fully duplex and fully linear, and avoids non-linear aspects to remove residual echo 315.

The above-described method facilitates cancellation of acoustic echo through using the decorrelation module 210. The above-described method provides a purely linear and fully duplex communication thereby eliminating choppy speech, background noise, non-full duplex double talk, etc. In addition, the above-described method enhances robustness of a solution through the usage of automatic signal limiters 335, saturation detectors 235 and Least Mean Square (LMS) update controls.

The above-described method achieves better stability of filter coefficients, even under double talk conditions and allows the state machine to become full duplex by being lenient towards double talk thus ensuring that no echo 125 leaks through. Further, the above-described technique provides effective echo cancellation and full duplex communication along with spectrally-matched comfort noise while retaining excellent voice quality.

The above-described method may be in a form of a machine-readable medium embodying a set of instructions that, when executed by a machine, causes the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method, comprising:
   calculating, via an echo estimation module, an echo estimate of an echo due to a far end signal associated with a communication;
   obtaining a residual echo by subtracting, via an echo subtraction module, the echo estimate from a near end signal associated with the communication;
   decorrelating, using a decorrelation module, the far end signal and the residual echo, wherein output of the decorrelation module is used for adaptations of an adaptive filter module;
   detecting and managing, via a dual double talk detector, double talk associated with the communication, comprising:
      computing, via a power based detector, a maximum power of the far end signal over a double talk detection window; and
      computing, via a correlation based detector, correlation between the echo estimate from the echo estimation module and the near end signal and between the residual echo and the near end signal;
   determining, via an acoustic echo canceller controller state machine, presence of the double talk based on the computed power and the computed correlations; and
   providing status information associated with the double talk to the acoustic echo canceller controller state machine.

2. The method of claim 1, further comprising:
   detecting, via a saturation detector, saturation associated with the near end signal of the communication; and
   bypassing adaptation of the adaptive filter module update upon detection of the saturation.

3. The method of claim 1, further comprising:
   generating, via a comfort noise generator, a spectrally-matched comfort noise; and mixing, via the comfort noise generator, the comfort noise with the residual echo.

4. A machine-readable medium embodying a set of instructions that, when executed by a machine, causes the machine to:
   calculate, via an echo estimation module, an echo estimate of an echo due to a far end signal associated with a communication;
   obtain a residual echo by subtracting, via an echo subtraction module, the echo estimate from a near end signal associated with the communication;
   decorrelate, using a decorrelation module, the far end signal and the residual echo, wherein output of the decorrelation module is used for adaptations of an adaptive filter module;
   detect and manage, via a dual double talk detector, double talk associated with the communication, the step of detecting and managing comprising:
      computing, via a power based detector, a maximum power of the far end signal over a double talk detection window; and
      computing, via a correlation based detector, correlation between the echo estimate from the echo estimation module and the near end signal and between the residual echo and the near end signal;
   determine, via an acoustic echo canceller controller state machine, presence of the double talk based on the computed power and the computed correlations; and
   provide status information associated with the double talk to the acoustic echo canceller controller state machine.

5. A system, comprising:
   an echo estimation module to calculate an echo estimate of an echo due to a far end signal associated with a communication;
   an echo subtraction module to obtain a residual echo by subtracting the echo estimate from a near end signal associated with the communication;
   a decorrelation module to decorrelate the far end signal and the residual echo;
   an adaptive filter module to receive output of the decorrelation module for performing adaptations of the adaptive filter module;
   a dual double talk detector to detect and manage double talk associated with the communication, wherein the dual double talk detector comprises:
      a power based detector to compute a maximum power of the far end signal over a double talk detection window; and
      a correlation based detector to compute correlation between the echo estimate from the echo estimation module and the near end signal and between the residual echo and the near end signal; and
   an acoustic echo canceller controller state machine to determine presence of the double talk based on the computed power and the computed correlations and to receive status information associated with the double talk.

6. The system of claim 5, further comprising:
   a saturation detector to detect saturation associated with the near end signal of the communication and to bypass adaptation of the adaptive filter module updates upon detection of the saturation.

7. The system of claim 5, further comprising:
   a comfort noise generator to generate a spectrally-matched comfort noise and to mix the comfort noise with the residual echo.

8. The system of claim 5, further comprising:
   a steady state detector state machine to detect a state selected from the group consisting essentially of a steady state and a transient state associated with the communication;
   during the steady state,
      a dynamic activity detection and switching state machine to dynamically detect at least one of internal substates associated with the communication and to dynamically detect a transition between the internal substates and associated configurations for the adaptive filter module, wherein the internal substates include at least one element selected from the group consisting essentially of a receive only state, a transmit only state, a receive-to-transmit state, a transmit-to-receive state, and an idle state; and
      the acoustic echo canceller controller state machine to refine the transition between internal substates using an output of the dual double talk detector, to manage transition speeds across different internal substates based on a current substate and a substate to which transition is happening, and to override a transition hangover using the double talk status information and cause a faster transition from a single talk state to a double talk substate.

9. The system of claim 8, wherein the configurations for the adaptive filter module comprises adapting with a normal rate of adaptation during a steady state and in the receive only state; adapting with a slow rate of adaptation during a steady state and in a substate selected from the group consisting essentially of the receive-to-transmit state and the transmit-to-receive state; bypassing adaptation during a steady state and in a substate selected from the group consisting essentially of the transmit only state and the idle state; adapting with a normal rate of adaptation during single talk during a transition to and from the receive only state and bypassing the adaptation during double talk during a transition to and a transition from the receive only state.

10. The method of claim 1, further comprising:
detecting, via a steady state detector state machine, a state selected from the group consisting essentially of a steady state and a transient state associated with the communication;
during the steady state,
dynamically detecting, via a dynamic activity detection and switching state machine, at least one of internal substates associated with the communication, wherein the internal substates include at least one element selected from the group consisting essentially of a receive only state, a transmit only state, a receive-to-transmit state, a transmit-to-receive state, and an idle state;
dynamically detecting, via the dynamic activity detection and switching state machine, a transition between the internal substates and associated configurations for the adaptive filter module;
refining, via an acoustic echo canceller controller state machine, the transition between internal substates using an output of the dual double talk detector;
managing transition speeds across different internal substates based on a current substate and a substate to which transition is happening; and
using the double talk status to override, via the acoustic echo canceller controller state machine, a transition hangover and cause a faster transition from a single talk state to a double talk sub state.

11. The method of claim 10, wherein the configurations for the adaptive filter module comprise:
adapting with a normal rate of adaptation during a steady state and in the receive only state;
adapting with a slow rate of adaptation during a steady state and in a substate selected from the group consisting essentially of the receive-to-transmit state and the transmit-to-receive state;
bypassing adaptation during a steady state and in a substate selected from the group consisting essentially of the transmit only state and the idle state;
adapting with a normal rate of adaptation during single talk during a transition to and from the receive only state; and
bypassing adaptation during double talk during a transition to and a transition from the receive only state.

12. The method of claim 10, further comprising:
defining maximum and minimum values of gain (Gres) that linearly attenuates the residual echo without using a non-linear processing element; and
managing, as part of the dynamic activity detection and switching state machine, changes to the values of the gain (Gres) as transitions happen from one substate to another.

13. The method of claim 10, further comprising:
backing up, via a backup and restore module, filter coefficients associated with the echo estimation module based on decision of the dynamic activity detection and switching state machine; and
restoring, via the backup and restore module, the filter coefficients for use with the echo estimation module based on the decision of the dynamic activity detection and switching state machine.

14. The system of claim 8, further comprising:
a backup and restore module to back up filter coefficients associated with the echo estimation module based on decision of the dynamic activity detection and switching state machine, and to restore the filter coefficients for use with the echo estimation module based on the decision of the dynamic activity detection and switching state machine.

15. The machine-readable medium of claim 4, further having instructions to:
detect, via a steady state detector state machine, a state selected from the group consisting essentially of a steady state and a transient state associated with the communication;
during the steady state,
dynamically detect, via a dynamic activity detection and switching state machine, at least one of internal substates associated with the communication, wherein the internal substates include at least one element selected from the group consisting essentially of a receive only state, a transmit only state, a receive-to-transmit state, a transmit-to-receive state, and an idle state;
dynamically detect, via the dynamic activity detection and switching state machine, a transition between the internal substates and associated configurations for the adaptive filter module;
refine, via an acoustic echo canceller controller state machine, the transition between internal substates using an output of the dual double talk detector;
manage transition speeds across different internal substates based on a current substate and a substate to which transition is happening; and
use the double talk status to override, via the acoustic echo canceller controller state machine, a transition hangover and cause a faster transition from a single talk state to a double talk sub state.

16. The machine-readable medium of claim 15, wherein the configurations for the adaptive filter module comprise:
adapting with a normal rate of adaptation during a steady state and in the receive only state;
adapting with a slow rate of adaptation during a steady state and in a substate selected from the group consisting essentially of the receive-to-transmit state and the transmit-to-receive state;
bypassing adaptation during a steady state and in a substate selected from the group consisting essentially of the transmit only state and the idle state;
adapting with a normal rate of adaptation during single talk during a transition to and from the receive only state; and
bypassing adaptation during double talk during a transition to and a transition from the receive only state.

* * * * *